(12) United States Patent
Cumming

(10) Patent No.: US 9,891,910 B1
(45) Date of Patent: Feb. 13, 2018

(54) SYSTEMS AND METHODS FOR PRE-PROCESSING AND RUNTIME DISTRIBUTION OF INTERACTIVE CONTENT

(71) Applicant: Secret Location Inc., Toronto (CA)

(72) Inventor: John Cumming, Toronto (CA)

(73) Assignee: Secret Location Inc., Toronto (CA)

( * ) Notice: Subject to any disclaimer, the term of this patent is extended or adjusted under 35 U.S.C. 154(b) by 0 days.

(21) Appl. No.: 15/716,432

(22) Filed: Sep. 26, 2017

Related U.S. Application Data

(60) Provisional application No. 62/558,780, filed on Sep. 14, 2017.

(51) Int. Cl.
| | |
|---|---|
| *G06F 9/44* | (2006.01) |
| *G06F 9/445* | (2018.01) |
| *G06T 19/00* | (2011.01) |
| *H04L 29/08* | (2006.01) |

(52) U.S. Cl.
CPC .............. *G06F 8/67* (2013.01); *G06F 8/68* (2013.01); *G06F 8/71* (2013.01); *G06T 19/006* (2013.01); *H04L 67/025* (2013.01)

(58) Field of Classification Search
CPC ..... G06F 8/67; G06F 8/68; G06F 8/71; G06T 19/006
USPC .......................................................... 717/172
See application file for complete search history.

(56) References Cited

U.S. PATENT DOCUMENTS

| | | | | |
|---|---|---|---|---|
| 2014/0297711 | A1* | 10/2014 | He ...................... | G06F 17/2247 709/202 |
| 2016/0036983 | A1* | 2/2016 | Korolev .............. | H04M 3/5233 379/265.12 |
| 2017/0091734 | A1* | 3/2017 | Chanda ................ | G06Q 20/145 |
| 2017/0104809 | A1* | 4/2017 | Wood ...................... | H04L 67/06 |
| 2017/0134934 | A1* | 5/2017 | Abramson ........ | H04M 1/72563 |
| 2017/0207926 | A1* | 7/2017 | Gil ........................ | H04L 12/282 |

* cited by examiner

*Primary Examiner* — Anna Deng
(74) *Attorney, Agent, or Firm* — Sheppard, Mullin, Richter & Hampton LLP

(57) ABSTRACT

Source interactive content is obtained, including asset objects and code objects. Interactive content metadata is generated from the source interactive content, the interactive content metadata identifying links between asset objects and code objects. Target interactive content is generated from the source interactive content, the target interactive content being capable of playback using the interactive content metadata, the target interactive content being otherwise incapable of playback without the interactive content metadata. The target interactive content and interactive content metadata are packaged into an interactive content package for each of a plurality of different platform formats. A runtime request for interactive content is received, and a platform format associated with the runtime request is identified. A particular platform-specific interactive content package is selected based on the platform format associated with the runtime request. The particular platform-specific interactive content package is provided for interactive content playback.

16 Claims, 12 Drawing Sheets

SYSTEMS AND METHODS FOR PRE-PROCESSING AND RUNTIME DISTRIBUTION OF INTERACTIVE CONTENT

CROSS-REFERENCE TO RELATED APPLICATIONS

The present application claims priority to U.S. Provisional Patent Application Ser. No. 62/558,780, filed Sep. 14, 2017 and entitled "Systems and Methods for Pre-Processing and Runtime Distribution of Interactive Content," which is hereby incorporated by reference herein.

TECHNICAL FIELD

This disclosure pertains to systems for providing interactive content. More specifically, this disclosure pertains to systems for pre-processing and runtime distribution of interactive content.

BACKGROUND

Development engines (e.g., Unity, Unreal Engine) are powerful environments for creating applications (e.g., video games). Traditionally, each time that code that accompanies and/or operates on artistic artifacts are modified, the entire application needs to be rebuilt and then redistributed to every user system.

SUMMARY

A claimed solution rooted in computer technology overcomes problems specifically arising in the realm of computer technology. In various embodiments, a computing system is configured to pre-process interactive content (e.g., virtual reality content and/or augmented reality content) and provide runtime distribution of the pre-processed interactive content to interactive content player systems (e.g., implemented by virtual reality headsets and/or augmented reality devices). The pre-processing may allow the interactive content player systems to dynamically load and playback interactive content, rather than having to download and execute an entire new monolithic application. This may allow, for example, modifications to interactive content to be efficiently provided to the interactive content player systems.

Various embodiments of the present disclosure include systems, methods, and non-transitory computer readable media configured to obtain source interactive content, the source interactive content including asset objects and code objects. Interactive content metadata is generated from the source interactive content, the interactive content metadata identifying one or more links between the asset objects and the code objects. Target interactive content is generated from the source interactive content, the target interactive content being capable of playback using the interactive content metadata, the target interactive content being otherwise incapable of playback without the interactive content metadata. The target interactive content and the interactive content metadata are packaged into a respective platform-specific interactive content package for each of a plurality of different platform formats. A runtime request for interactive content is received, and a platform format associated with the runtime request is identified. A particular platform-specific interactive content package of the plurality of respective platform-specific interactive content packages is selected based on the platform format associated with the runtime request. The particular platform-specific interactive content package of the plurality of platform-specific interactive content packages is provided for interactive content playback.

In some embodiments, the interactive content metadata is generated based on iterative inspection and reflection of the source interactive content.

In some embodiments, the interactive content metadata is generated based on a metadata data model specific to a content development engine used to create the source interactive content.

In some embodiments, the target interactive content is generated based on compiling the code objects into one or more platform-agnostic intermediate library assemblies.

In some embodiments, the packaging includes transcoding the assets based platform format associated with the interactive content request.

Various embodiments of the present disclosure include systems, methods, and non-transitory computer readable media configured to perform: presenting a control environment, the control environment executing according to a particular platform format; receiving, through the control environment, a user selection of a particular interactive content item; generating a runtime request for the particular interactive content item, the runtime request indicating the particular platform format; receiving an interactive content package based on the runtime request, the interactive content package include target interactive content and interactive content metadata; re-linking the target interactive content based on the interactive content metadata, thereby creating re-linked target interactive content; and playing back the re-linked target interactive content.

In some embodiments, the re-linked target interactive content is compiled into a dynamically loadable executable, the re-linked target content being played-back based on a dynamic execution of the dynamically loadable executable.

In some embodiments, the re-linking includes using the interactive content metadata to reconstitute one or more links of the target interactive content.

In some embodiments, the systems, methods, and non-transitory computer readable media are further configured to perform inserting a playback monitor into the re-linked target interactive content, the playback monitor being capable detecting one or more playback errors; playing back the re-linked target interactive content; and if the playback monitor detects a playback error, exiting the playback and returning to the control environment.

In some embodiments, the systems, methods, and non-transitory computer readable media are further configured to perform validating the target interactive content prior to the re-linking.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Development engines (e.g., Unity, Unreal Engine) are powerful environments for creating applications (e.g., video games). Traditionally, each time that code that accompanies and/or operates on artistic artifacts are modified, the entire application needs to be rebuilt and then redistributed to every user system.

A claimed solution rooted in computer technology overcomes problems specifically arising in the realm of computer technology. In various embodiments, a computing system is configured to pre-process interactive content (e.g., virtual reality content and/or augmented reality content) and provide runtime distribution of the pre-processed interactive content to interactive content player systems (e.g., implemented by virtual reality headsets and/or augmented reality devices). The pre-processing may allow the interactive content player systems to dynamically load and playback interactive content, rather than having to download and execute an entire new monolithic application. This may allow, for example, modifications to interactive content to be efficiently provided to the interactive content player systems.

Figure 1:
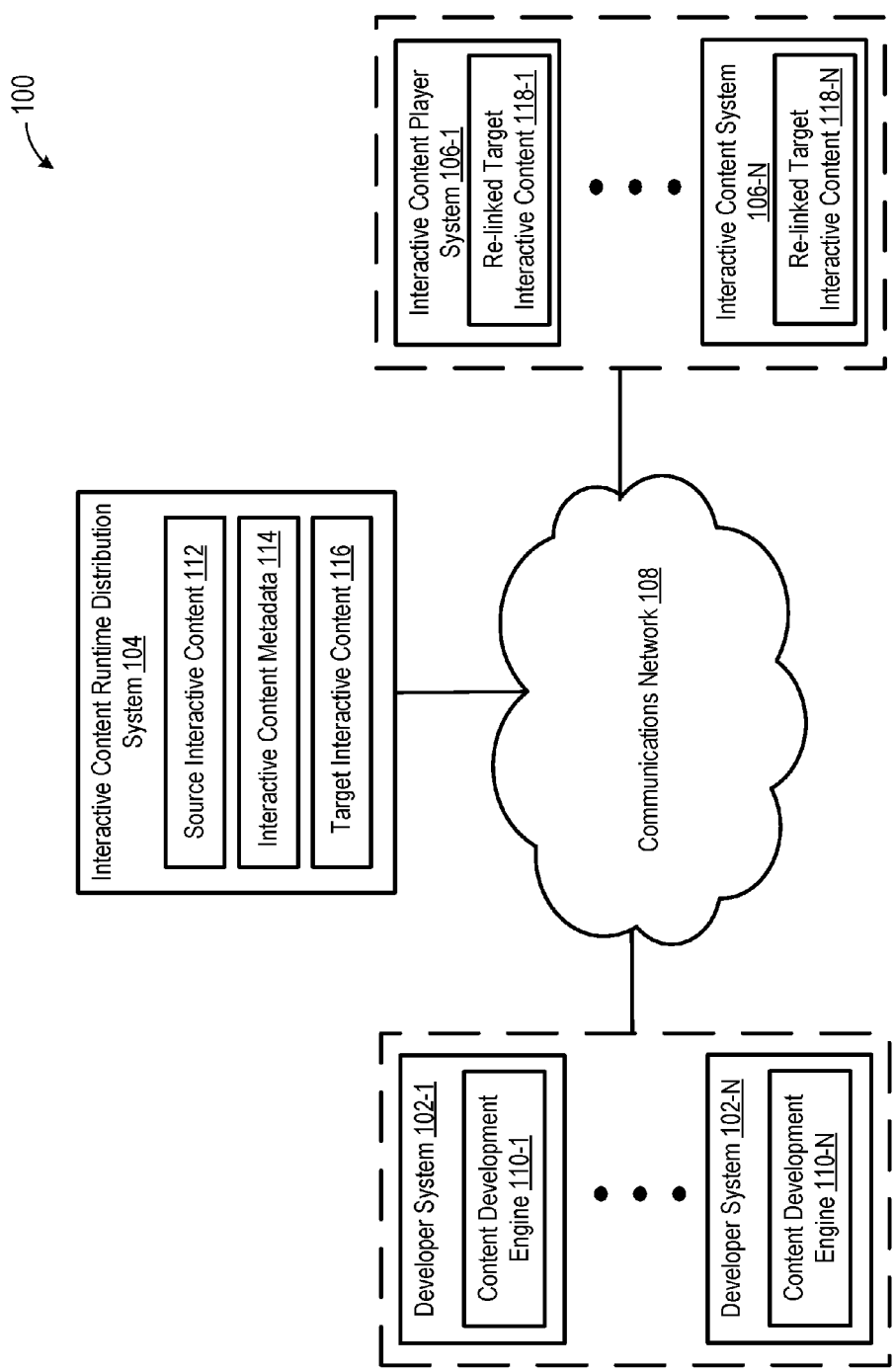
FIG. 1 depicts a diagram of an example system for runtime distribution of interactive content according to some embodiments.

FIG. 1 depicts a diagram 100 of an example system for runtime distribution of interactive content according to some embodiments. In the example of FIG. 1, the system includes developer systems 102-1 to 102-N (individually, the developer system 102, collectively, the developer systems 102), interactive content runtime distribution system 104, interactive content player systems 106-1 to 106-N (individually, the interactive content player system 106, collectively, the interactive content player systems 106), and a communication network 108.

The developer systems 102 may function to create and/or provide interactive content. Interactive content may include virtual reality (VR) content, augmented reality (AR) content, and/or the like. Generally, interactive content may include asset objects, code objects, and/or scene objects. Asset objects may include images, video, text, models, textures, and/or the other objects (e.g., Unity GameObjects). Code objects may include source code and/or byte code that operate on the asset objects to present interactive content to a user of an interactive content player system (e.g., as implemented on a VR headset and/or AR device). Scene objects may include a hierarchy of asset objects within interactive content. It will be appreciated that the scene objects may include the asset objects themselves and/or references to the asset objects. In various embodiments, functionality of the developer systems 102 may be performed by one or more desktop computers, laptop computers, mobile device (e.g., smartphones, tablets, and/or the like), servers (e.g., a cloud-based server) and/or other computing devices.

In some embodiments, the developer systems 102 may function to create source interactive content. Source interactive content may include source code of code objects and/or other source items (e.g., asset objects) created by a content development engine 110 (Unity, Unreal Engine). The content development engine 110 may be a software and/or hardware framework designed for the creation of applications (e.g., video games). For example, a user (e.g., software engineer) may interact with the content development engine 110 to create source interactive content by creating, defining and/or assigning values to asset objects, code objects, and/or scene objects (or, collectively, "interactive content objects"). Source interactive content may be particular to the content development engine 110 that is used to create the source interactive content.

The interactive content runtime distribution system 104 may function to obtain, store and/or pre-process source interactive content 112. Source interactive content may be obtained from remote systems (e.g., developer systems 102) and/or generated by the interactive content runtime distribution system 104. In various embodiments, functionality of the interactive content runtime distribution system 104 may be performed by one or more servers (e.g., a cloud-based server) and/or other computing devices. In various embodiments, as with the other systems described herein, some or all of the features of the interactive content runtime distribution system 104 may be implemented as a standalone system, and/or implemented as part of one or more other systems and/or engines (e.g., developer systems 102, content development engines 110, interactive content player systems 106, and/or the like).

In some embodiments, the interactive content runtime distribution system 104 unpackages interactive content objects from source interactive content 112, and/or prepares the source interactive content 112 for playback within interactive content player systems (e.g., interactive content player systems 106) for each platform (e.g., PC, Android, MacOS, and/or the like) that the interactive content player systems execute within. Preparing the source interactive content 112 for playback may include generating interactive content metadata 114 and target interactive content 116. For example, the interactive content runtime distribution system 104 may compile code objects of the source interactive content 112 into intermediate code objects (e.g., intermediate library byte code assemblies) to generate the target interactive content 116. This may be helpful, for example, because the target interactive content 116 may be provided to interactive content player systems 106 for interactive content playback, regardless of the interactive content player system platform.

In some embodiments, unlike traditional distribution system, the target interactive content 116 does not include the content development engine itself, but rather relies on a content development engine of a target system (e.g., an interactive content player system 106) to provide the functionality of the content development engine.

In some embodiments, generating the target interactive content 116 removes links, references, relationships, attachments, and/or other behaviors (or, collectively, "links") between interactive content objects. For example, the source interactive content 112 may have particular code objects linked to particular asset objects, and generating the target interactive content 116 may remove such links. Accordingly, the target interactive content 116 is not capable of being played back by an interactive content player system without a mechanism for re-linking the interactive content objects of the target interactive content 116. In some embodiments, the interactive content metadata 114 provides such a mechanism.

In some embodiments, the interactive content runtime distribution system 104 generates the interactive content metadata 114 using various analyses (e.g., static and/or dynamic analyses to determine if all the static and dynamic references can be satisfied) of the interactive content objects. The analyses may include reflection based inspection. For example, the interactive content runtime distribution system 104 may use reflection based inspection of the code objects and/or scene objects. The analyses may identify the link information (or, simply, "links") between the interactive content objects and their components. The links may be stored as interactive content metadata 114.

In some embodiments, the interactive content runtime distribution system 104 includes one or more content development engines. For example, the interactive content runtime distribution system 104 may include content development engines corresponding to the content development engines 110. The interactive content runtime distribution system 104 may simulate playback of the source interactive content 112 and perform the analyses on the simulated playback of the source interactive content 112.

In some embodiments, the interactive content runtime distribution system 104 packages interactive content metadata 114 and target interactive content 116. As used herein, "packages" may be compressed and/or encrypted. For example, the interactive content runtime distribution system 104 may generate separate packages for different interactive content player system platform formats. The interactive content runtime distribution system 104 may provide the packages to the interactive content player systems which may then process (e.g., re-link) the target interactive content 116 using the interactive content metadata 114 to dynamically execute and playback the underlying interactive content (e.g., as it was linked in the source interactive content 112).

In some embodiments, the interactive content runtime distribution system 104 validates target interactive content 116 to help ensure it does not contain errors that would prevent and/or otherwise inhibit execution and/or compilation on an interactive content player system. Security validation may also be performed to ensure that the target interactive content 116 complies with security guidelines for interactive content playback. The interactive content runtime distribution system may cryptographically sign the target interactive content 116 once it is validated.

The interactive content player systems 106 may function to download and/or dynamically playback pre-processed interactive content (e.g., target interactive content 116). For example, the interactive content player systems 106 may re-link target interactive content 116 using interactive content metadata 114, and playback the re-linked target interactive content 118. In some embodiments, functionality of the interactive content player systems 106 may be performed by VR devices (e.g., VR headset), AR devices, and/or other computing devices.

In some embodiments, the interactive content player systems 106 may dynamically load compiled code objects in their intermediate library form into memory, and resolve all static code references. The interactive content player systems 106 may then instantiate the first scene object, and re-link it into a well-formed scene object ready for execution. Using the interactive content metadata 114, the code objects may be instantiated and initialized dynamically and linked into the scene object.

The communications network 108 may represent one or more computer networks (e.g., LAN, WAN, or the like) or other transmission mediums. The communication network 108 may provide communication between systems 102-106 and/or other systems/engines described herein. In some embodiments, the communication network 108 includes one or more computing devices, routers, cables, buses, and/or other network topologies (e.g., mesh, and the like). In some embodiments, the communication network 108 may be wired and/or wireless. In various embodiments, the communication network 108 may include the Internet, one or more wide area networks (WANs) or local area networks (LANs), one or more networks that may be public, private, IP-based, non-IP based, and so forth.

Figure 2:
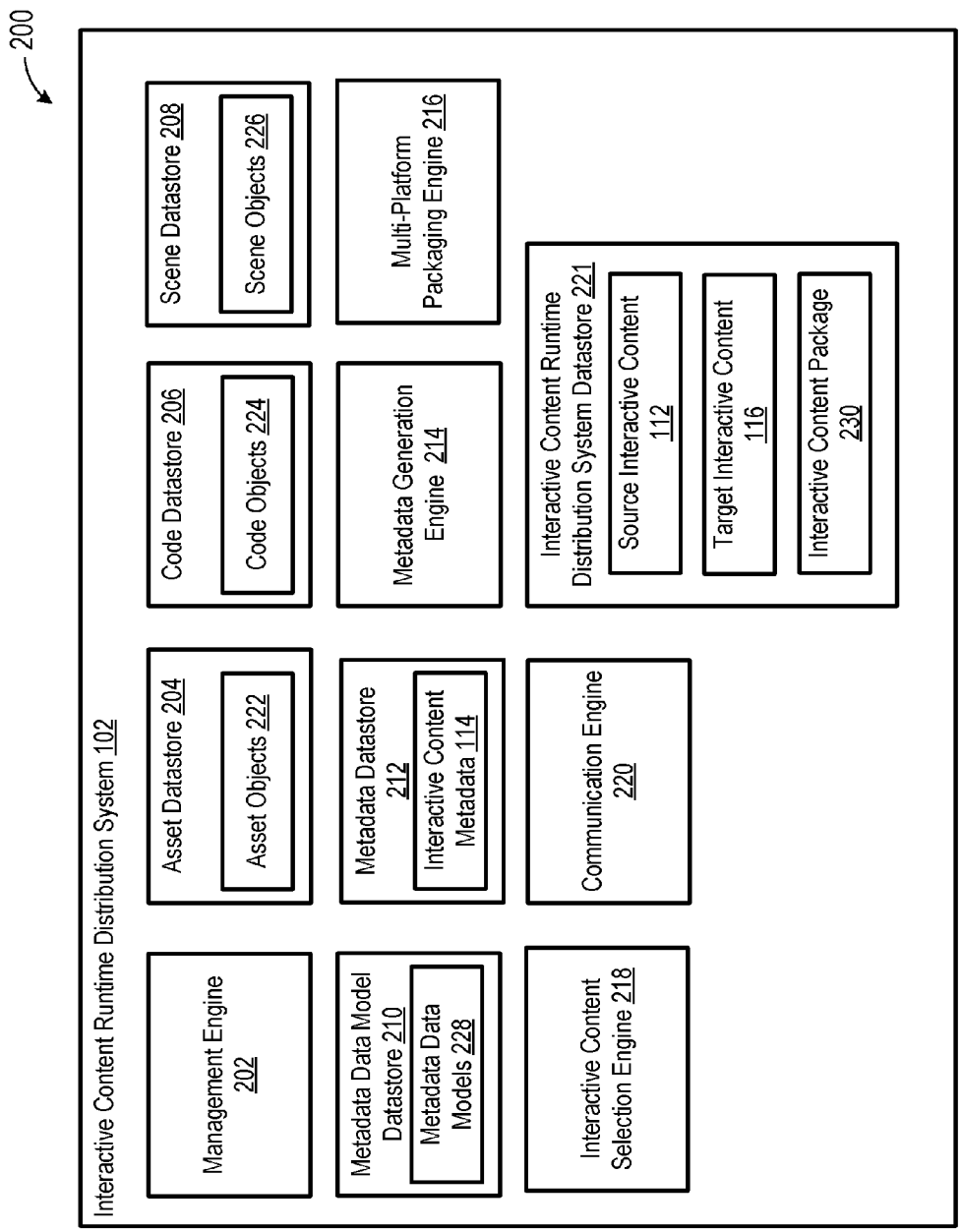
FIG. 2 depicts a diagram of an example of an interactive content runtime distribution system according to some embodiments.

FIG. 2 depicts a diagram 200 of an example of an interactive content runtime distribution system 104 according to some embodiments. In the example of FIG. 2, the interactive content runtime distribution system 104 includes a management engine 202, an asset datastore 204, a code datastore 206, a scene datastore 208, a metadata data model datastore 210, a metadata datastore 212, a metadata generation engine 214, a multi-platform packaging engine 216, an interactive content selection engine 218, a communication engine 220, and an interactive content runtime distribution system datastore 221.

The management engine 202 may be configured to manage (e.g., create, read, update, delete, or otherwise access) asset objects 222 stored in the asset datastore 204, code objects 224 stored in the code datastore 206, scene objects 226 stored in the scene datastore 208, metadata data models 228 stored in the metadata data model datastore 210, interactive content metadata 114 stored in the metadata datastore 212, and/or other information stored in the interactive content runtime distribution system datastore 221. The management engine 202 may perform any of these operations manually (e.g., by a user interacting with a GUI) and/or automatically (e.g., triggered by one or more of the engines 214-220, discussed below). In some embodiments, the management engine 202 comprises a library of executable instructions, which are executable by one or more processors for performing any of the aforementioned management operations.

The metadata generation engine 214 may function to generate and/or store interactive content metadata 114. For example, the metadata generation engine 214 may unpack interactive content objects from source interactive content 112, and cooperate with the management engine 202 to store the asset objects 222 in the asset datastore 204, code objects 224 in the code datastore 206, and scene objects 226 in the scene datastore 208. The metadata generation engine 214 may generate the interactive content metadata 114 using a metadata data model 228. An example metadata data model 228 is described in FIG. 8.

In some embodiments, the metadata generation engine 214 analyzes (e.g., iteratively) the structure and/or behavior of each of the code objects and scene objects (e.g., including asset objects referenced and/or included in the scene objects) of source interactive content 112. For example, the metadata generation engine 214 may include a content development engine. The content development engine may correspond to another instance of the same content development engine (e.g., content development engine 110) used to create the source interactive content 112. The content development engine of the metadata generation engine 214 may be used to simulate playback and/or other executions of the source interactive content 112. The simulation may allow the metadata generation engine 214 to use inspection and/or reflection to iteratively analyze the structure and/or behavior of each of the code objects 224 and scene objects 226 during simulation. Based on the analysis, the metadata generation engine 214 may identify one or more links, references, structures, and/or behaviors between any of the interactive content objects of the source interactive content 112, and/or components thereof (e.g., fields, scripts, and/or the like).

The multi-platform packaging engine 216 may function to generate target interactive content 116 from source interactive content 112. For example, the multi-platform packaging engine 216 may compile and/or otherwise transform code objects 224 into intermediate library assembly byte code, and/or transcode asset objects 222 based on a platform-specific format (e.g., Android, MacOS, Unity Engine, Unreal Engine).

In some embodiments, the multi-platform packaging engine 216 packages the target interactive content 116 and interactive content metadata 114. For example, the multi-platform packaging engine 216 may package intermediate code objects (e.g., the compiled code objects), transcoded asset objects, scene objects 226 and/or interactive content metadata 114 into an interactive content package 230. The interactive content package 230 may comprise a format (e.g., interchange format) native to the content development engine 110.

The interactive content selection engine 218 may function to select interactive content for providing to one or more remote systems (e.g., interactive content player system 106). For example, the interactive content selection engine 218 may cooperate with the communication engine 220 to receive a runtime request for interactive content. The interactive content selection engine 218 may select a corresponding interactive content package 230 based on the requested interactive content and/or platform format associated with the request.

The communication engine 220 may function to send requests, transmit and, receive communications, and/or otherwise provide communication with one or a plurality of systems. In some embodiments, the communication engine 220 functions to encrypt and decrypt communications. The communication engine 220 may function to send requests to and receive data from one or more systems through a network or a portion of a network. Depending upon implementation-specified considerations, the communication engine 220 may send requests and receive data through a connection, all or a portion of which may be a wireless connection. The communication engine 220 may request and receive messages, and/or other communications from associated systems. Communications may be stored at least temporarily (e.g., cached and/or persistently) in the interactive content runtime distribution system datastore 221.

The interactive content runtime distribution system datastore 221 may function to store, at least temporarily, data received from one or more other systems. For example, the interactive content runtime distribution system datastore 221 may store messages received by the communication engine 220. Like other datastores described herein, the interactive content runtime distribution system datastore 221 may reside local to the interactive content runtime distribution system 104, or comprise an associated remote storage system (e.g., a cloud storage system).

Figure 3:
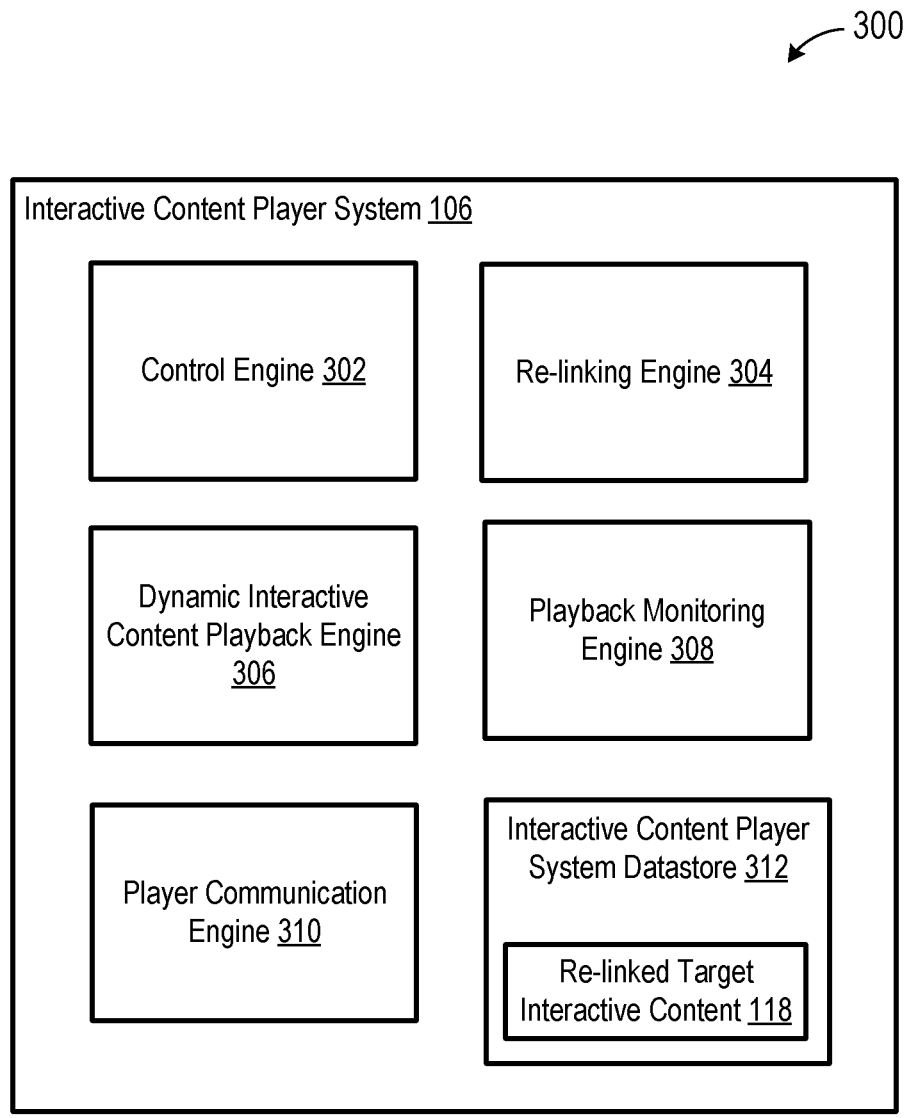
FIG. 3 depicts a diagram of an example of an interactive content player system according to some embodiments.

FIG. 3 depicts a diagram 300 of an example of an interactive content player system 106 according to some embodiments. In the example of FIG. 3, the interactive content player system 106 includes a control engine 302, a re-linking engine 304, a dynamic interactive content playback engine 306, a playback monitoring engine 308, a player communication engine 310, and an interactive content player system datastore 312.

The control engine 302 may function to present a control environment. For example, the control environment may comprise an interactive content display (e.g., a VR display include menus, icons, and/or the like). The control environment may include a library of interactive content items. The control engine 302 may select interactive content items for dynamic playback (e.g., in response to user input). In some embodiments, the control engine 302 generates a runtime request for an interactive content package 230 in response to and/or based on selection of a corresponding interactive content item.

The re-linking engine 304 may function to generate interactive content that is ready for dynamic playback. In some embodiments, the re-linking engine 304 re-links target interactive content 116 using interactive content metadata 114. The re-linking engine 304 may unpackage the interactive content package 230. For example, the re-linking engine 304 may unpack the asset objects, code objects, scene objects, and/or interactive content metadata 114 from the interactive content package 230.

In some embodiments, the re-linking engine 304 identifies one or more links between components of target interactive content 116 (e.g., transcoded asset objects, intermediate code objects, scene objects) based on interactive content metadata 114. For example, the re-linking engine 304 may iterate over the interactive content metadata 114 and/or target interactive content 116 to identify the one or more links, and accordingly instantiate code objects, set field values, link code objects to asset objects and/or scene objects, and/or otherwise re-link the target interactive content 116. In some embodiments, the re-linking engine 304 compiles (e.g., just in time compiles) a dynamic executable from the re-linked target interactive content 118.

The dynamic interactive content playback engine 306 may function to dynamically playback re-linked target interactive content 118. In some embodiments, the dynamic interactive content playback engine 306 includes some or all of a content development engine baked into the dynamic interactive content playback engine 306, which allows the dynamic interactive content playback engine 306 to dynamically load and/or playback interactive content using the re-linked target interactive content 118 (e.g., as opposed to requiring an entire monolithic application). This may allow, for example, the dynamic interactive content playback engine 306 to playback interactive content in a manner similar to a video application (e.g., QuickTime) playing back movies.

The playback monitoring engine 308 may function to monitor playback of interactive content for actual errors and/or anticipated errors. In some embodiments, the playback monitoring engine 308 inserts a playback monitor into re-linked target interactive content 118 prior to playback. The playback monitoring engine 308 may determine whether any actual errors have been detected during playback and/or if any anticipated errors have been detected during playback. For example, if a threshold resource usage is exceeded, the playback monitoring engine 308 may detect an anticipated error.

In some embodiments, if the playback monitoring engine 308 detects a playback error (e.g., an actual error and/or an anticipated error), the playback monitoring engine 308 terminates and/or otherwise interrupts (e.g., pause and/or hold) the playback of the re-linked interactive content 118, and returns to the control environment. For example, a user interacting with the interactive content may be brought back to a main menu or screen of the control environment.

In some embodiments, the playback monitoring engine 308 checks for some or all of the following:
Does the frame rate meet platform requirements
Do menu and back buttons meet platform requirements
Can the interactive content cleanly exit back to the control environment.

The player communication engine 310 may function to send requests, transmit and, receive communications, and/or otherwise provide communication with one or a plurality of systems. In some embodiments, the player communication engine 310 functions to encrypt and decrypt communications. The player communication engine 310 may function to send requests to and receive data from one or more systems through a network or a portion of a network. Depending upon implementation-specified considerations, the player communication engine 310 may send requests and receive data through a connection, all or a portion of which may be a wireless connection. The player communication engine 310 may request and receive messages, and/or other communications from associated systems. Communications may be stored at least temporarily (e.g., cached and/or persistently) in the interactive content player system datastore 312.

The interactive content player system datastore 312 may function to store, at least temporarily, data received from one or more other systems. For example, the interactive content player system datastore 312 may store messages received by the player communication engine 310. Like other datastores described herein, the interactive content player system datastore 312 may reside local to the interactive content player system 106, or comprise an associated remote storage system (e.g., a cloud storage system).

Figure 4:
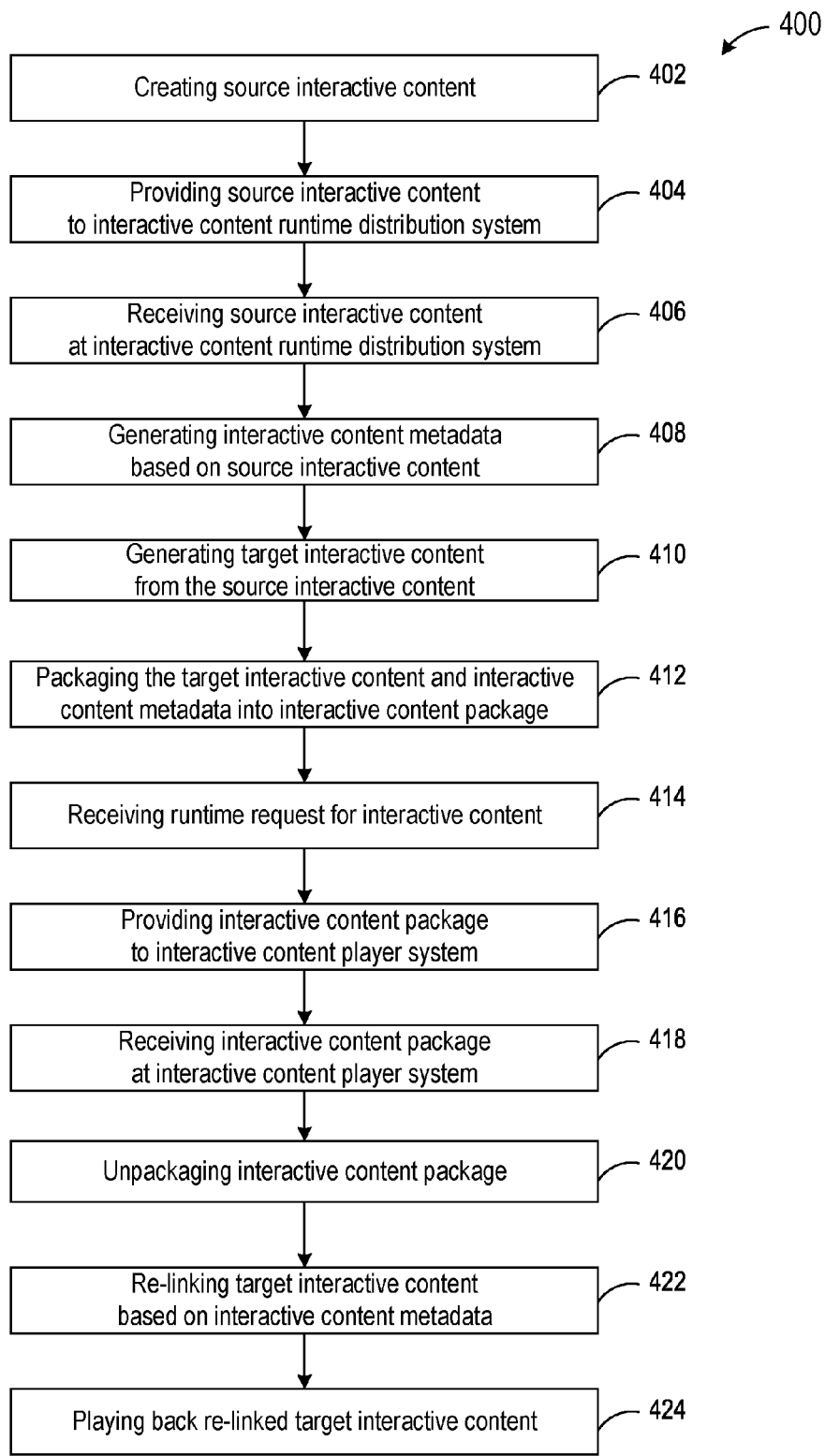
FIG. 4 depicts a flowchart of an example of a method of runtime distribution and execution of interactive content according to some embodiments.

FIG. 4 depicts a flowchart 400 of an example of a method of runtime distribution and execution of interactive content according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 402, a developer system (e.g., developer system 102) creates source interactive content (e.g., source interactive content 112). In some embodiments, a content development engine (e.g., content development engine 110) and/or a developer user creates the interactive content. For example, a developer user may interact with the content development engine to create the source interactive content.

In step 404, the developer system provides the source interactive content to an interactive content runtime distribution system (e.g., interactive content runtime distribution system 104). In some embodiments, the developer system may manually (e.g., in response to user input) and/or automatically (e.g., without requiring user input) upload the source interactive content to the interactive content runtime distribution system. For example, the developer system may upload the source interactive content in response to one or more trigger events (e.g., a commit event).

In step 406, the interactive content runtime distribution system receives the source interactive content. In some embodiments, a communication engine (e.g., communication engine 220) receives the source interactive content over a communication network (e.g., communication network 108).

In step 408, the interactive content runtime distribution system generates interactive content metadata (e.g., interactive content metadata 114) based on the source interactive content. In some embodiments, a metadata generation engine (e.g., metadata generation engine 214) generates the interactive content metadata. In some embodiments, the interactive content metadata is stored in a metadata datastore (e.g., metadata datastore 212). An example method of generating interactive content metadata is described in FIG. 7.

In step 410, the interactive content runtime distribution system generates target interactive content (e.g., target interactive content 116) from the source interactive content. For example, the interactive content runtime distribution system may compile and/or otherwise transform code objects (e.g., code objects 224) into intermediate library assembly byte code, transcode asset objects (e.g., asset objects 222) based on a platform-specific format (e.g., Android, MacOS, Unity Engine, Unreal Engine). In some embodiments, a multi-platform packaging engine (e.g., multi-platform packaging engine 216) generates the target interactive content.

In step 412, the interactive content runtime distribution system packages the target interactive content and the interactive content metadata. For example, the interactive content runtime distribution system may package the code objects (e.g., the compiled code objects), asset objects (e.g., transcoded asset objects), scene objects (e.g., scene objects 226) and/or interactive content metadata into an interactive content package (e.g., interactive content package 230). The interactive content package may comprise a format (e.g., interchange format) native to the content development engine. In some embodiments, the multi-platform packaging engine packages the target interactive content and the interactive content metadata.

In step 414, the interactive content runtime distribution system receives a runtime request for interactive content. For example, the interactive content runtime distribution system may receive the runtime request from an interactive content player system (e.g., interactive content player system 106). In some embodiments, the communication engine receives the runtime request over the communications network.

In step 416, the interactive content runtime distribution system provides the interactive content package based on and/or in response to receiving the runtime request. In some embodiments, the communication provides the interactive content package to the interactive content player system over the communication network.

In step 418, the interactive content player system receives the interactive content package. In some embodiments, a player communication engine (e.g., player communication engine 310) receives the interactive content package over the communications network.

In step 420, the interactive content player system unpackages the interactive content package. For example, the interactive content player system may unpack the asset objects, code objects, scene objects, and/or interactive content metadata from the interactive content package. In some embodiments, a re-linking engine (e.g., re-linking engine 304) unpackages the interactive content package.

In step 422, the interactive content player system re-links the target interactive content based on the interactive content metadata. In some embodiments, the re-linking engine re-links the target interactive content. An example method of re-linking is described in FIG. 8.

In step 424, the interactive content player system plays back the re-linked target interactive content. In some embodiments, a dynamic interactive content playback engine (e.g., dynamic interactive content playback engine 306) plays back the re-linked target interactive content.

Figure 5:
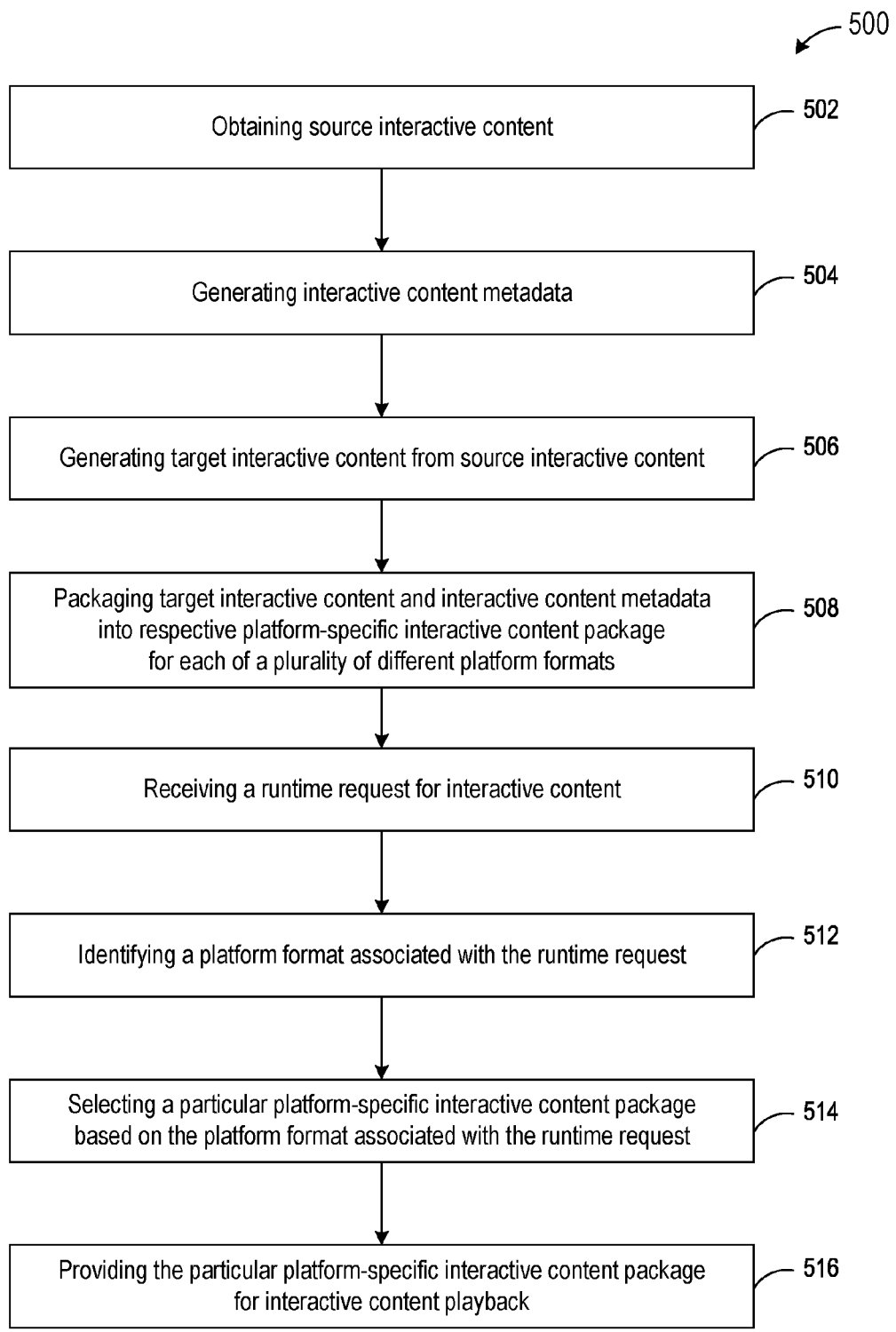
FIG. 5 depicts a flowchart of an example of a method of operation of an interactive content runtime distribution system according to some embodiments.

FIG. 5 depicts a flowchart 500 of an example of a method of operation of an interactive content runtime distribution system according to some embodiments.

In step 502, an interactive content runtime distribution system (e.g., interactive content runtime distribution system 104) obtains source interactive content (e.g., source interactive content 112). The source interactive content may include asset objects (e.g., asset objects 222) and code objects (e.g., code objects 224). In some embodiments, a communication engine (e.g., communication engine 220) receives the source interactive content. For example, the communication engine may receive the source interactive content from a developer system (e.g., developer system 102) over a communication network (e.g., communication network 108).

In step 504, the interactive content runtime distribution system generates interactive content metadata (e.g., interactive content metadata 114) from the source interactive content. The interactive content metadata may identify one or more links between the asset objects and the code objects. In some embodiments, a metadata generation engine (e.g., metadata generation engine 214) generates the interactive content metadata.

In step 506, the interactive content runtime distribution system generates target interactive content (e.g., target interactive content 116) from the source interactive content. The target interactive content may be capable of playback using the interactive content metadata, the target interactive content being otherwise incapable of playback without the interactive content metadata. For example, the source interactive content may contain one or more links necessary to playback interactive content, and the target interactive content may not include those links. The interactive content metadata may be used (e.g., by an interactive content player system) to re-link the target metadata (e.g., corresponding the original links of the source interactive content). In some embodiments, a multi-platform packaging engine (e.g., multi-platform packaging engine 216) generates the target interactive content.

In step 508, the interactive content runtime distribution system packages the target interactive content and the interactive content metadata into a respective platform-specific interactive content package for each of a plurality of different platform formats. For example, the interactive content runtime distribution system may package the code objects (e.g., the compiled code objects), asset objects (e.g., transcoded asset objects), scene objects (e.g., scene objects 226) and/or interactive content metadata into a first platform-specific interactive content package (e.g., an Android package), a second platform-specific interactive content package (e.g., a MacOS) package, a third platform-specific interactive content package (e.g., Oculus Rift package), and so forth. In some embodiments, the multi-platform packaging engine performs the packaging.

In step 510, the interactive content runtime distribution system receives a runtime request for interactive content. For example, the interactive content runtime distribution system may receive the runtime request from an interactive content player system (e.g., interactive content player system 106). In some embodiments, the communication engine receives the runtime request over the communications network.

In step 512, the interactive content runtime distribution system identifies a platform format associated with the runtime request. In some embodiments, an interactive content selection engine (e.g., interactive content selection engine 218) performs the identification.

In step 514, the interactive content runtime distribution system selects a particular platform-specific interactive content package of the plurality of respective platform-specific interactive content packages based on the platform format associated with the runtime request. In some embodiments, the interactive content selection engine performs the selection.

In step 516, the interactive content runtime distribution system provides the particular platform-specific interactive content package of the plurality of platform-specific interactive content packages for interactive content playback. In some embodiments, the multi-platform packaging engine cooperates with the communication engine to provide the particular platform-specific interactive content package to an interactive content player system (e.g., interactive content player system 106) over the communications network.

Figure 6:
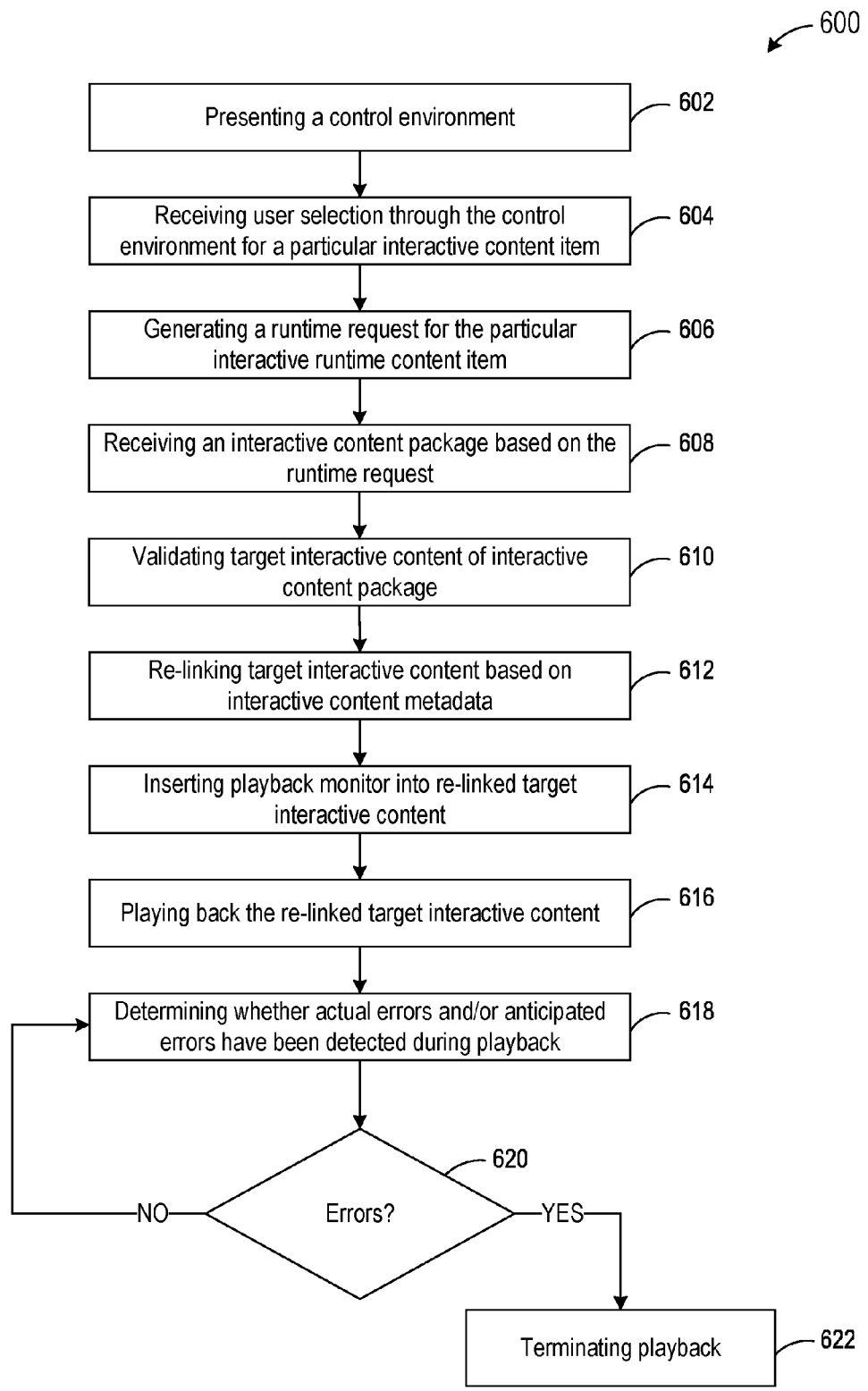
FIG. 6 depicts a flowchart of an example of a method of operation of an interactive content player system according to some embodiments.

FIG. 6 depicts a flowchart 600 of an example of a method of operation of an interactive content player system according to some embodiments.

In step 602, an interactive content player system (e.g., interactive content player system 106) presents a control environment, the control environment executing according to a particular platform format. In some embodiments, a control engine (e.g., control engine 302) presents the control environment.

In step 604, the interactive content player system receives, through the control environment, a user selection of a particular interactive content item. In some embodiments, the control engine receives the user selection.

In step 606, the interactive content player system generates a runtime request for the particular interactive content item, the runtime request indicating a particular platform format. In some embodiments, the control engine generates the runtime request.

In step 608, the interactive content player system receives an interactive content package (e.g., interactive content package 230) based on the runtime request, the interactive content package including target interactive content (e.g., target interactive content 116) and interactive content metadata (e.g., interactive content metadata 114). In some embodiments, a player communication engine (e.g., player communication engine 310) receives the interactive content package.

In step 610, the interactive content player system validates the target interactive content of the target interactive content package (e.g., prior to re-linking the target interactive content). For example, the interactive content player system may validate a digital signature of the target interactive content and/or interactive content package. In some embodiments, a re-linking engine (e.g., re-linking engine 304) validates the interactive content.

In step 612, the interactive content player system re-links the target interactive content based on the interactive content metadata, thereby creating re-linked target interactive content. In some embodiments, the re-linking engine re-links the target interactive content.

In step 614, the interactive content player system inserts a playback monitor into the re-linked target interactive content, the playback monitor being capable detecting one or more playback errors. In some embodiments, a playback monitoring engine (e.g., playback monitoring engine 308) inserts the playback monitor into the re-linked target interactive content.

In step 616, the interactive content player system plays back the re-linked target interactive content. In some embodiments, a dynamic interactive content playback engine (e.g., dynamic interactive content playback engine 306) may playback the re-linked target interactive content. For example, the dynamic interactive content playback engine may include some or all of the features and/or functionality of a corresponding content development engine (e.g., content development engine 110). This may allow, for example, playback of the re-linked target interactive content without having provide such features and/or functionality in the target interactive content and/or the interactive content package.

In step 618, the interactive content player system determines whether any actual errors have been detected during playback and/or if any anticipated errors have been detected during playback. For example, if a threshold resource usage is exceeded, it may detect an anticipated error. In some embodiments, the playback monitoring engine performs the determination and/or detections.

In step 620, the interactive content player system, if the playback monitor detects a playback error (e.g., an actual error and/or an anticipated error), the interactive content runtime distribution system terminates and/or otherwise interrupts (e.g., pause and/or hold) the playback of the re-linked interactive content, and returns to the control environment. For example, a user interacting with the playback may be brought back to a main menu or screen of the control environment. In some embodiments, the playback monitoring engine performs the error handling.

Figure 7:
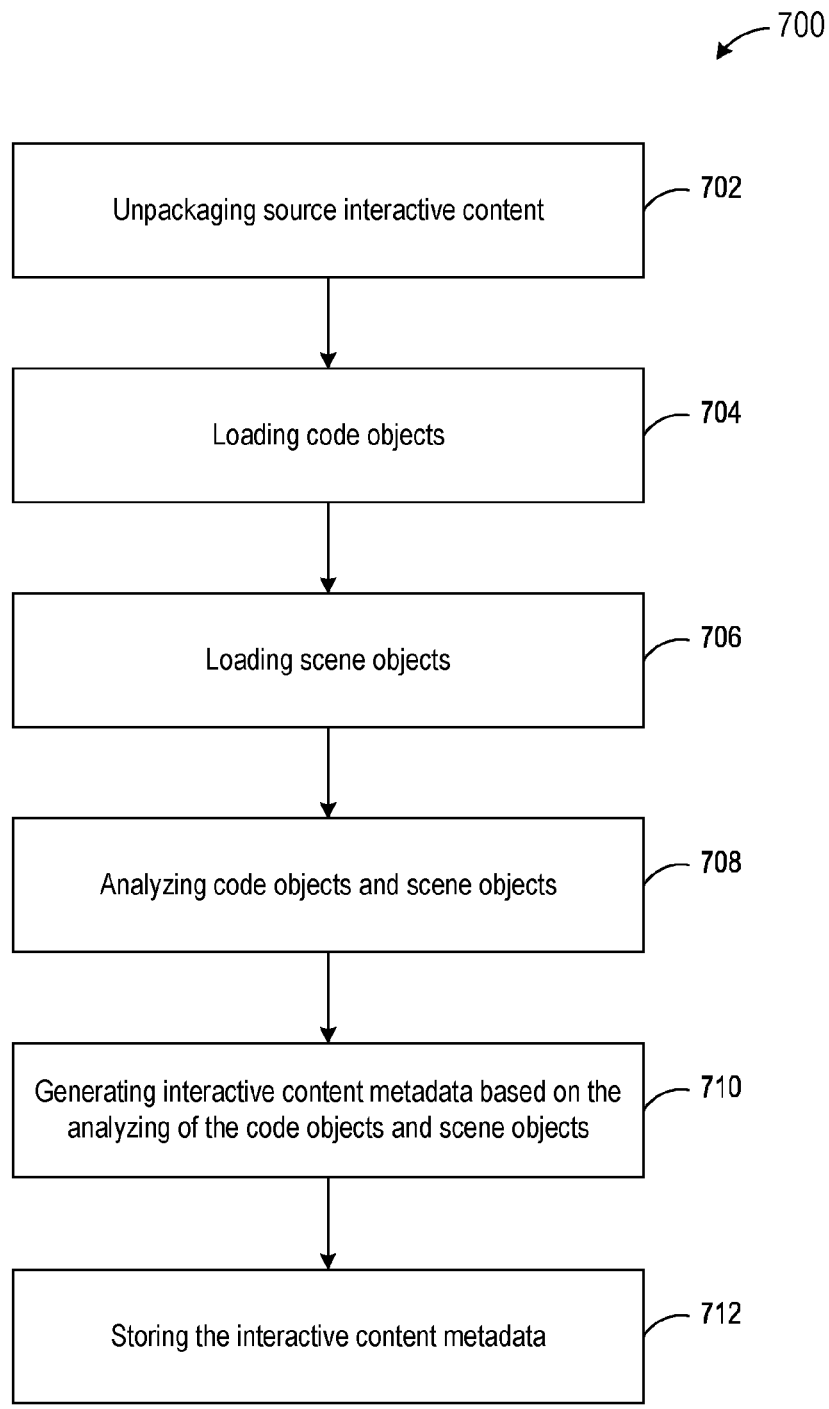
FIG. 7 depicts a flowchart of an example of a method of generating interactive content metadata according to some embodiments.

FIG. 7 depicts a flowchart 700 of an example of a method of generating interactive content metadata according to some embodiments.

In step 702, an interactive content runtime distribution system (e.g., interactive content runtime distribution system 104) unpackages source interactive content (e.g., source interactive content 112). For example, the interactive content runtime distribution system may unpack asset objects (e.g., asset objects 222), code objects (e.g., code objects 224), and/or scene objects (e.g., scene objects 226) from the source interactive content. The source interactive content may comprise the original source code, assets and/or scenes created by a content development engine (e.g., content development engine 110) used by a developer. In some embodiments, a metadata generation engine (e.g., metadata generation engine 214) unpackages the source interactive content, and an management engine (e.g., management engine 202) stores the asset objects in an asset datastore (e.g., asset datastore 204), code objects in a code datastore (e.g., code datastore 206), and scene objects in a scene datastore (e.g., scene datastore 208).

In step 704, the interactive content runtime distribution system loads code objects of the source interactive content. For example, interactive content runtime distribution system may load the code objects into dynamic memory. In some embodiments, the metadata generation engine loads the code objects.

In step 706, the interactive content runtime distribution system loads scene objects (or, asset objects) of the source interactive content. For example, the interactive content runtime distribution system may load the scene objects into dynamic memory. In some embodiments, the metadata generation engine loads the scene objects.

In step 708, the interactive content runtime distribution system analyzes iteratively the structure and/or behavior of each of the code objects and scene objects (e.g., including asset objects referenced and/or included in the scene objects). For example, the metadata generation engine may include a content development engine. The content development engine may correspond to another instance of the same content development engine (e.g., content development engine 110) used to create the source interactive content. The content development engine of the metadata generation engine may be used to simulate playback and/or other execution of the source interactive content. The simulation may allow the metadata generation engine to use inspection and/or reflection to iteratively analyze the structure and/or behavior of each of the code objects and scene objects. The analysis may identify one or more links, references, structures, and/or behaviors between any of the asset objects, code objects, scene objects, and/or components thereof (e.g., fields, scripts, and/or the like).

In step 710, the interactive content runtime distribution system generates interactive content metadata (e.g., interactive content metadata 114) based on the analysis. For example, the interactive content metadata may include asset metadata, scene metadata, script metadata, field, GameObject metadata, and/or the like. As described elsewhere herein, GameObjects may comprise a particular type of asset object and/or code object, and the scene objects may comprise a hierarchy of GameObjects. In some embodiments, the metadata generation engine generates the interactive content metadata.

In step 712, the interactive content runtime distribution system stores the interactive content metadata. In some embodiments, a management engine (e.g., management engine 202) stores the interactive content metadata in a metadata datastore (e.g., metadata datastore 212).

Figure 8:
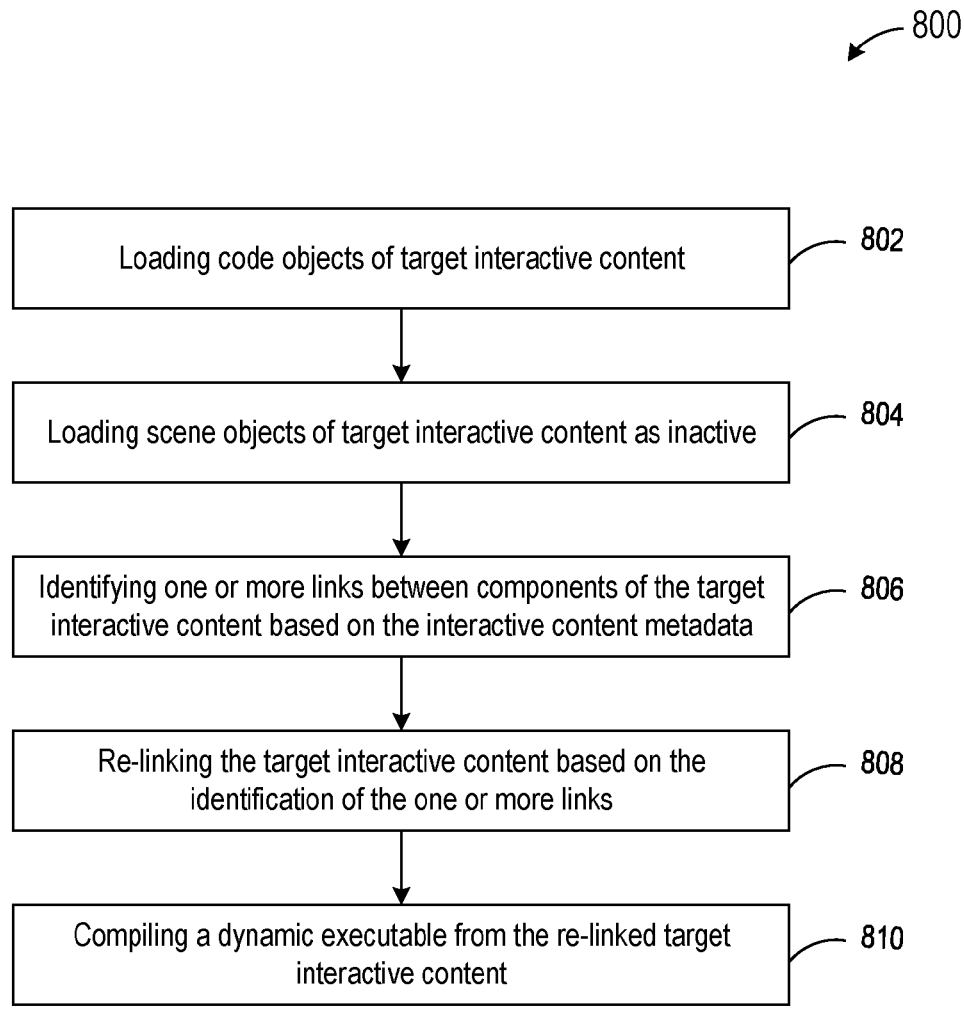
FIG. 8 depicts a flowchart of an example of a method of re-linking target interactive content using interactive content metadata according to some embodiments.

FIG. 8 depicts a flowchart 800 of an example of a method of re-linking target interactive content using interactive content metadata according to some embodiments.

In step 802, an interactive content runtime distribution system (e.g., interactive content runtime distribution system 104) loads code objects of target interactive content (e.g., target interactive content 116). For example, the interactive content runtime distribution system may load the code objects into a dynamic interactive content playback engine (e.g., dynamic interactive content playback engine 306). In some embodiments, a re-linking engine (e.g., re-linking engine 304) performs the loading.

In step 804, the interactive content runtime distribution system loads scene objects of the target interactive content as inactive. For example, the interactive content runtime distribution system may load the scene objects as inactive into the dynamic interactive content playback engine. In some embodiments, the re-linking engine performs the loading.

In step 806, the interactive content runtime distribution system identifies one or more links between components of the target interactive content (e.g., asset objects, code objects, scene objects) based on interactive content metadata (e.g., interactive content metadata 114). For example, the interactive content runtime distribution system may iterate over the interactive content metadata and/or target interactive content to identify the one or more links, and accordingly instantiate code objects, set field values, link code objects to asset objects and/or scene objects, and/or otherwise re-link the target interactive content (step 808). In some embodiments, the re-linking engine performs the link identification and/or re-linking.

In step 810, the interactive content runtime distribution system compiles (e.g., just in time compiles) a dynamic executable from the re-linked target interactive content. In some embodiments, the re-linking engine performs the compiling.

Figure 9:
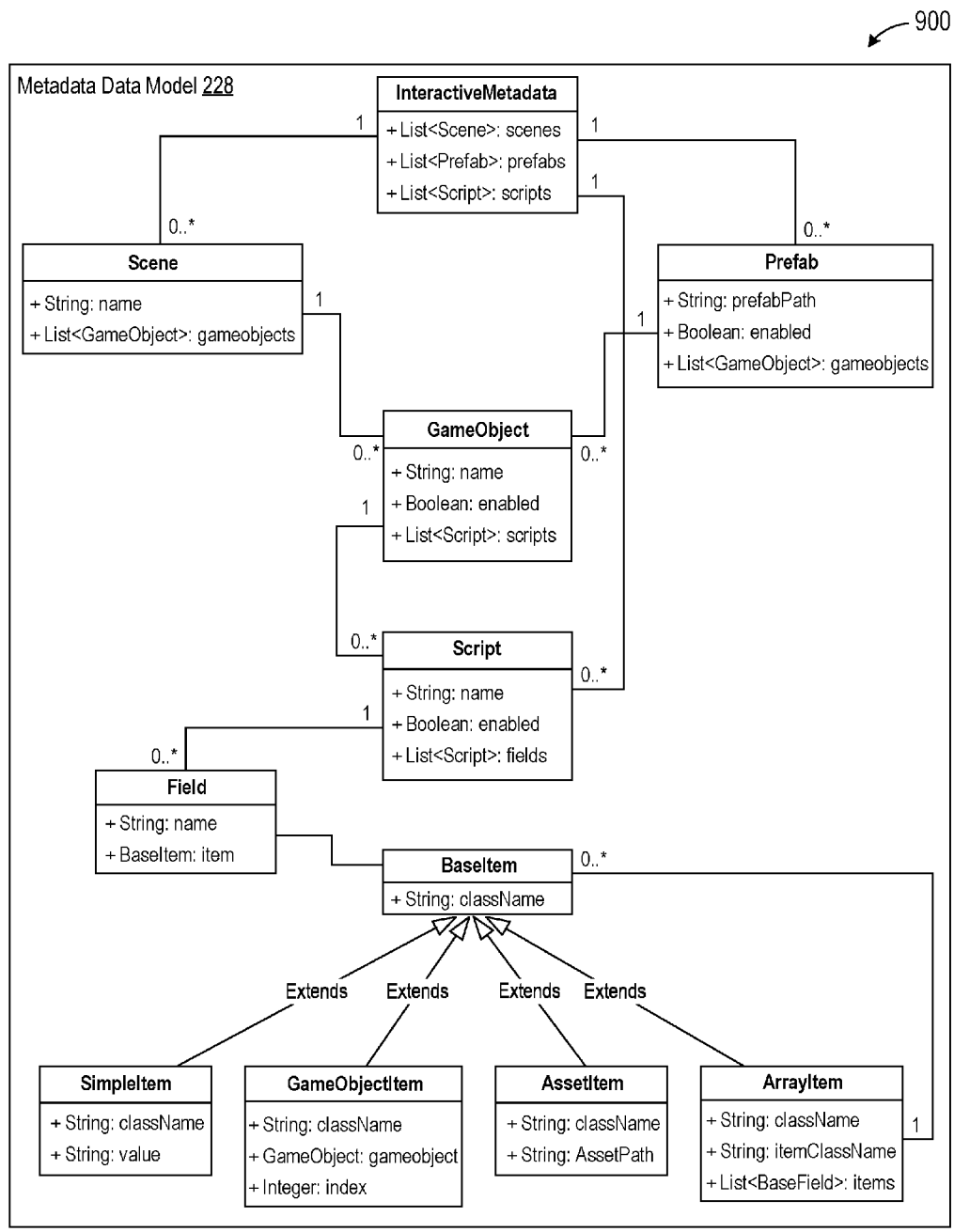
FIG. 9 depicts a flowchart of an example of a metadata data model for generating interactive content metadata according to some embodiments.

FIG. 9 depicts a diagram 900 of an example of a metadata data model 228 for generating interactive content metadata (e.g., interactive content metadata 114) according to some embodiments. In various embodiments, interactive content metadata encapsulates all the information that an interactive content player system (e.g., interactive content player system 106) needs to reassemble (or, "re-link" or "reconstitute") target interactive content (e.g., target interactive content 116) and/or components thereof (e.g., scene objects, asset objects, code objects) for playback within a dynamic interactive content playback engine (e.g., dynamic interactive content playback engine 306). The metadata data model 228 is shown in Unified Modelling Language (UML) for a particular type of content development engine (e.g., Unity). The actual storage of interactive content metadata and/or metadata data models can be implemented as serialized objects, such as a JavaScript Object Notation (JSON) file in order to facilitate transportability between disparate platforms.

Figure 10:
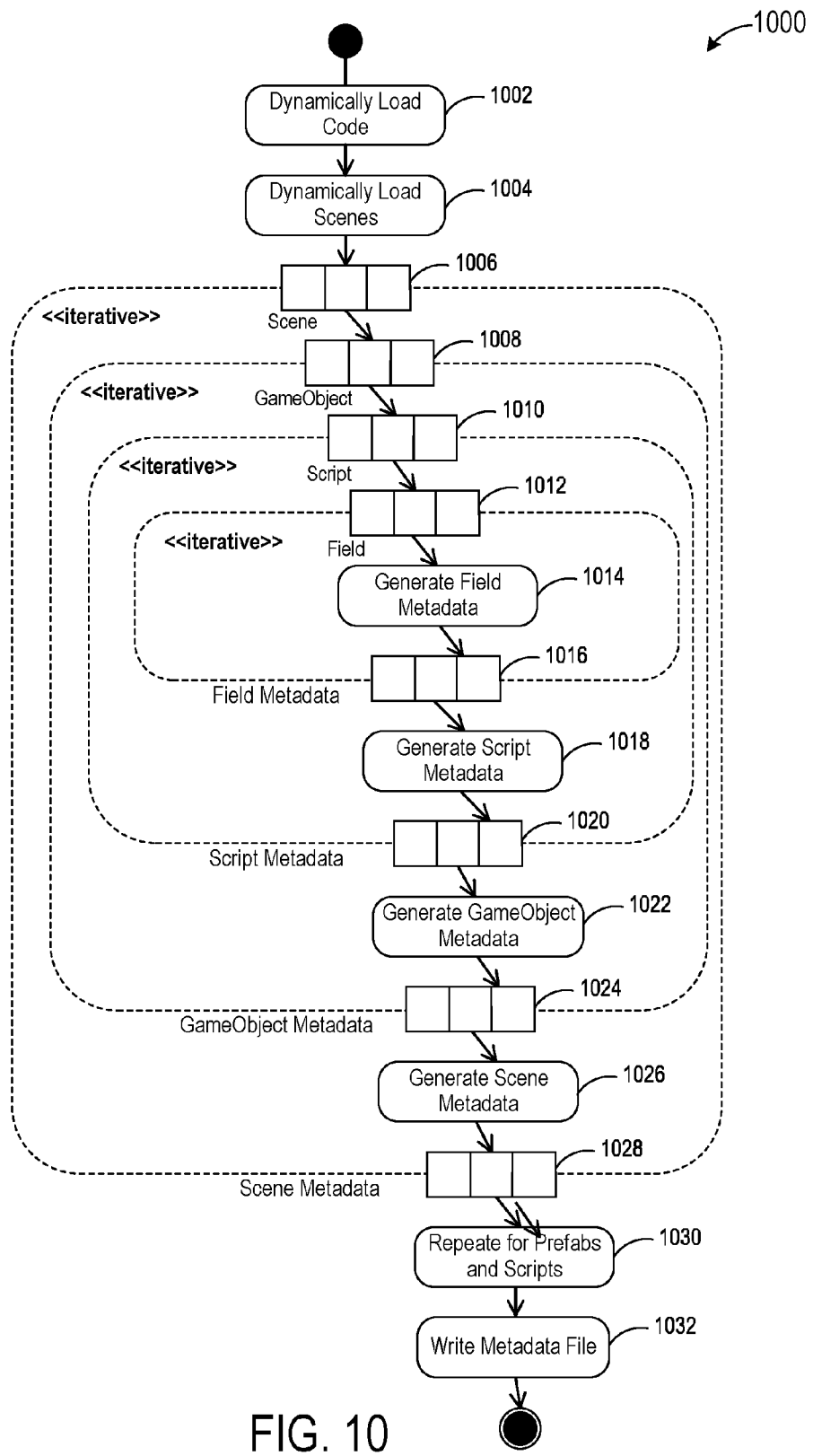
FIG. 10 depicts a flowchart of an example of a method of generating interactive content metadata according to some embodiments.

FIG. 10 depicts a flowchart 1000 of an example of a method of generating interactive content metadata (e.g., interactive content metadata 114) according to some embodiments. In step 1002, code objects (e.g., code objects 224) are dynamically loaded into memory. In step 1004, scene objects (e.g., scene objects 226) are dynamically loaded into memory. In steps 1006-1028, the interactive content metadata is iterated over to generate field metadata, script metadata, GameObject metadata, and scene metadata. In step 1030, this process may be repeated for prefab objects and/or other scripts (or, other code objects) that are not associated (e.g., linked or attached) with a particular GameObject and/or asset object. In step 1032, the interactive content metadata is written to a metadata file (e.g., interactive content metadata 114 in metadata datastore 212).

Figure 11:
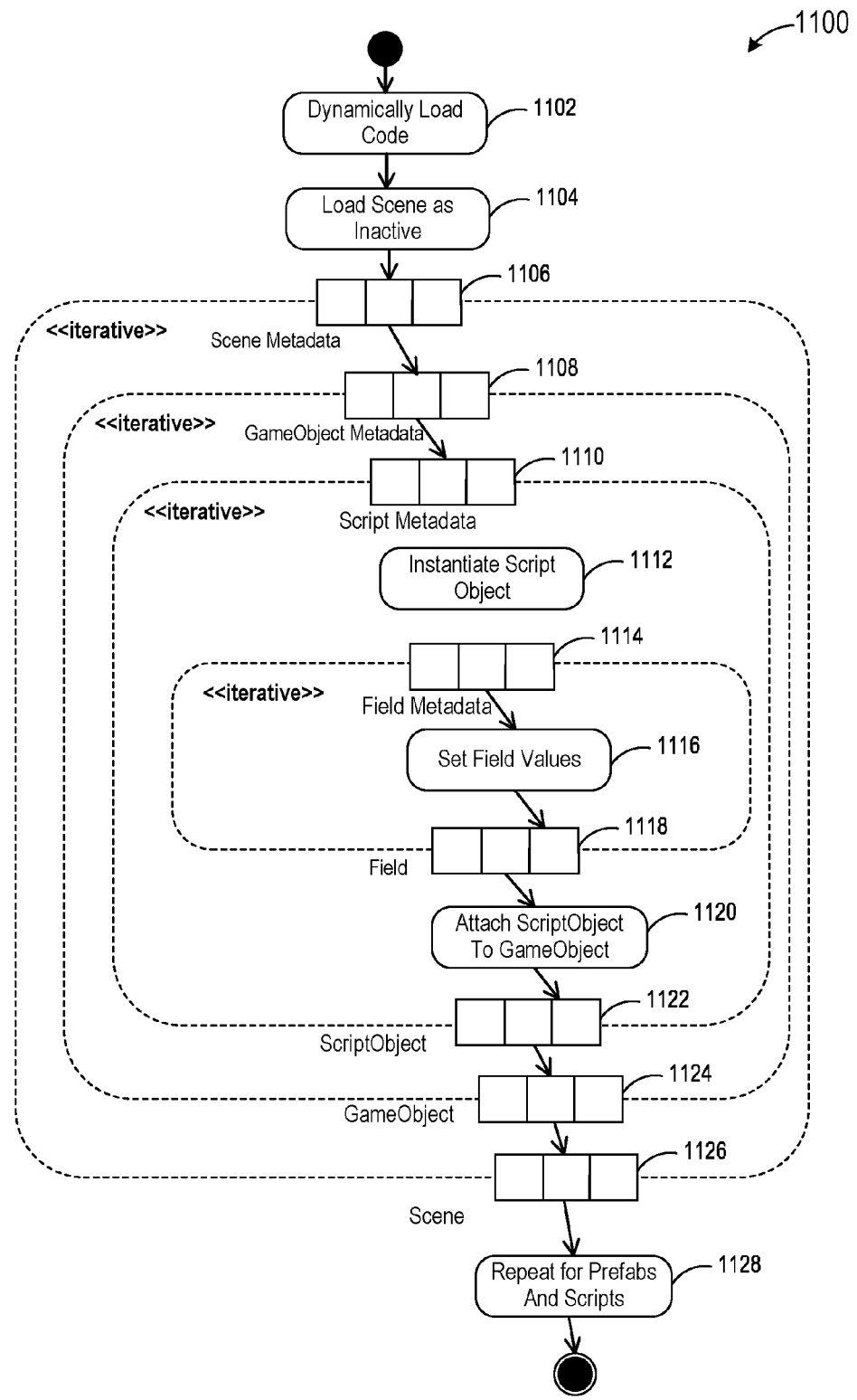
FIG. 11 depicts a flowchart of an example of a method of re-linking target interactive content according to some embodiments.

FIG. 11 depicts a flowchart 1100 of an example of a method of re-linking target interactive content according to some embodiments. In step 1102, code objects of target interactive content (e.g., target interactive content 116) is loaded into a dynamic interactive content playback engine (e.g., dynamic interactive content playback engine 306). In step 1104, scene objects of target interactive content are loaded into the dynamic interactive content playback engine as inactive. In step 1106-1128, interactive content metadata (e.g., interactive content metadata 114) is iterated over to instantiate code objects (e.g., script objects), set field values, attach code objects to game objects and/or other asset objects, instantiate prefab objects and/or other code object not associated with an asset object, and/or otherwise re-link the target interactive content for playback.

Figure 12:
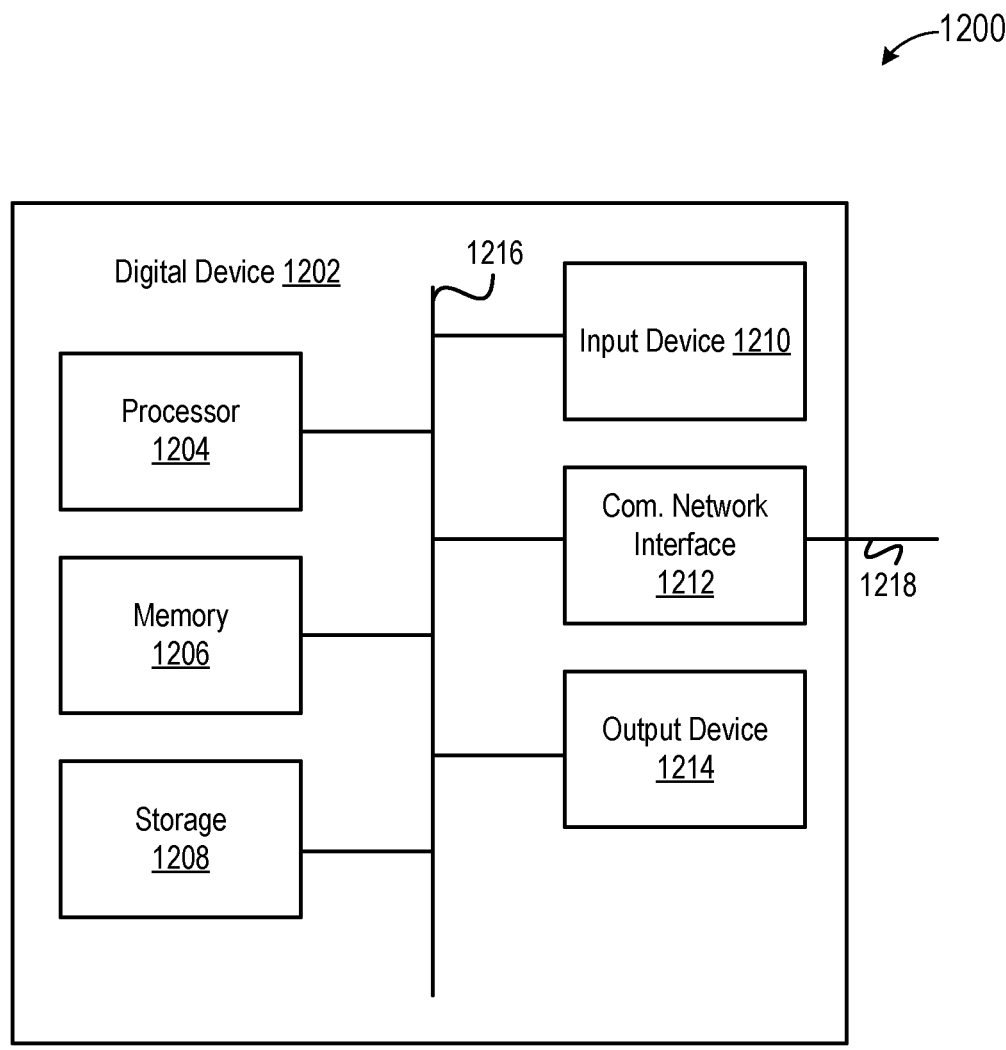
FIG. 12 is a diagram of an example computer system for implementing the features disclosed herein.

FIG. 12 depicts a diagram 1200 of an example of a computing device 1202. Any of the systems 102-106 and the communication network 108 may comprise an instance of one or more computing devices 1202. The computing device 1202 comprises a processor 1204, memory 1206, storage 1208, an input device 1210, a communication network interface 1212, and an output device 1214 communicatively coupled to a communication channel 1216. The processor 1204 is configured to execute executable instructions (e.g., programs). In some embodiments, the processor 1204 comprises circuitry or any processor capable of processing the executable instructions.

The memory 1206 stores data. Some examples of memory 1206 include storage devices, such as RAM, ROM, RAM cache, virtual memory, etc. In various embodiments, working data is stored within the memory 1206. The data within the memory 1206 may be cleared or ultimately transferred to the storage 1208.

The storage 1208 includes any storage configured to retrieve and store data. Some examples of the storage 1208 include flash drives, hard drives, optical drives, cloud storage, and/or magnetic tape. Each of the memory system 1206 and the storage system 1208 comprises a computer-readable medium, which stores instructions or programs executable by processor 1204.

The input device 1210 is any device that inputs data (e.g., mouse and keyboard). The output device 1214 outputs data (e.g., a speaker or display). It will be appreciated that the storage 1208, input device 1210, and output device 1214 may be optional. For example, the routers/switchers may comprise the processor 1204 and memory 1206 as well as a device to receive and output data (e.g., the communication network interface 1212 and/or the output device 1214).

The communication network interface 1212 may be coupled to a network (e.g., network 108) via the link 1218. The communication network interface 1212 may support communication over an Ethernet connection, a serial connection, a parallel connection, and/or an ATA connection. The communication network interface 1212 may also support wireless communication (e.g., 802.11 a/b/g/n, WiMax, LTE, WiFi). It will be apparent that the communication network interface 1212 may support many wired and wireless standards.

It will be appreciated that the hardware elements of the computing device 1202 are not limited to those depicted in FIG. 12. A computing device 1202 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1204 and/or a co-processor located on a GPU (e.g., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A computing system comprising:
   one or more processors; and
   memory storing instructions that, when executed by the one or more processors, cause the computing system to perform:
   obtaining source interactive content, the source interactive content including asset objects and code objects;
   generating interactive content metadata from the source interactive content, the interactive content metadata identifying one or more links between the asset objects and the code objects;
   packaging the target interactive content and the interactive content metadata into a respective platform-specific interactive content package for each of a plurality of different platform formats;
   receiving a runtime request for interactive content;
   identifying a platform format associated with the runtime request;
   selecting a particular platform-specific interactive content package of the plurality of respective platform-specific interactive content packages based on the platform format associated with the runtime request; and
   providing the particular platform-specific interactive content package of the plurality of platform-specific interactive content packages for interactive content playback.

2. The system of claim 1, wherein the interactive content metadata is generated based on iterative inspection and reflection of the source interactive content.

3. The system of claim 1, wherein the interactive content metadata is generated based on a metadata data model specific to a content development engine used to create the source interactive content.

4. The system of claim 1, wherein the target interactive content is generated based on compiling the code objects into one or more platform-agnostic intermediate library assemblies.

5. The system of claim 1, wherein the packaging the target interactive content and the interactive content metadata into a respective platform-specific interactive content package for each of the plurality of different platform formats includes transcoding the platform format associated with the runtime request.

6. A method being implemented by a computing system including one or more physical processors and storage media storing machine-readable instructions, the method comprising:
   obtaining source interactive content, the source interactive content including asset objects and code objects;
   generating interactive content metadata from the source interactive content, the interactive content metadata identifying one or more links between the asset objects and the code objects;
   generating target interactive content from the source interactive content, the target interactive content being capable of playback using the interactive content metadata, the target interactive content being otherwise incapable of playback without the interactive content metadata;
   packaging the target interactive content and the interactive content metadata into a respective platform-specific interactive content package for each of a plurality of different platform formats;
   receiving a runtime request for interactive content;
   identifying a platform format associated with the runtime request;
   selecting a particular platform-specific interactive content package of the plurality of respective platform-specific interactive content packages based on the platform format associated with the runtime request; and
   providing the particular platform-specific interactive content package of the plurality of platform-specific interactive content packages for interactive content playback.

7. The method of claim 6, wherein the interactive content metadata is generated based on iterative inspection and reflection of the source interactive content.

8. The method of claim 6, wherein the interactive content metadata is generated based on a metadata data model specific to a content development engine used to create the source interactive content.

9. The method of claim 6, wherein the target interactive content is generated based on compiling the code objects into one or more platform-agnostic intermediate library assemblies.

10. The method of claim 6, wherein the packaging the target interactive content and the interactive content metadata into a respective platform-specific interactive content package for each of the plurality of different platform formats includes transcoding the platform format associated with the runtime request.

11. A computing system comprising:
one or more processors; and
memory storing instructions that, when executed by the one or more processors, cause the computing system to perform:
presenting a control environment, the control environment executing according to a particular platform format;
receiving, through the control environment, a user selection of a particular interactive content item;
generating a runtime request for the particular interactive content item, the runtime request indicating the particular platform format;
receiving an interactive content package based on the runtime request, the interactive content package including target interactive content and interactive content metadata;
validating the target interactive content of the interactive content package;
re-linking the target interactive content based on the interactive content metadata, thereby creating re-linked target interactive content;
inserting a playback monitor into the re-linked target interactive content, the playback monitor being capable of detecting one or more playback errors;
playing back the re-linked target interactive content; and
if the playback monitor detects a playback error, exiting playback and returning to the control environment.

12. The computing system of claim 11, wherein the re-linked target interactive content is compiled into a dynamically loadable executable, and the playing back of the re-linked target interactive content is based on execution of the dynamically loadable executable.

13. The computing system of claim 11, wherein the re-linking the target interactive content based on the interactive content metadata includes using the interactive content metadata to reconstitute one or more links of the target interactive content.

14. A method being implemented by a computing system including one or more physical processors and storage media storing machine-readable instructions, the method comprising:
presenting a control environment, the control environment executing according to a particular platform format;
receiving, through the control environment, a user selection of a particular interactive content item;
generating a runtime request for the particular interactive content item, the runtime request indicating the particular platform format;
receiving an interactive content package based on the runtime request, the interactive content package including target interactive content and interactive content metadata;
validating the target interactive content of the interactive content package;
re-linking the target interactive content based on the interactive content metadata, thereby creating re-linked target interactive content;
inserting a playback monitor into the re-linked target interactive content, the playback monitor being capable of detecting one or more playback errors;
playing back the re-linked target interactive content; and
if the playback monitor detects a playback error, exiting playback and returning to the control environment.

15. The method of claim 14, wherein the re-linked target interactive content is compiled into a dynamically loadable executable, and the playing back of the re-linked target interactive content is based on execution of the dynamically loadable executable.

16. The method of claim 14, wherein the re-linking the target interactive content based on the interactive content metadata includes using the interactive content metadata to reconstitute one or more links of the target interactive content.

* * * * *

UNITED STATES PATENT AND TRADEMARK OFFICE
CERTIFICATE OF CORRECTION

| | |
|---|---|
| PATENT NO. | : 9,891,910 B1 |
| APPLICATION NO. | : 15/716432 |
| DATED | : February 13, 2018 |
| INVENTOR(S) | : John Cumming |

It is certified that error appears in the above-identified patent and that said Letters Patent is hereby corrected as shown below:

In the Claims

Claim 1, Column 18, Line 4:
"and the code objects;" should read -- and the code objects; generating target interactive content from the source interactive content, the target interactive content being capable of playback using the interactive content metadata, the target interactive content being otherwise incapable of playback without the interactive content metadata; --.

Signed and Sealed this
Seventeenth Day of July, 2018

Andrei Iancu
*Director of the United States Patent and Trademark Office*